United States Patent [19]

Yamamoto et al.

[11] 4,151,572
[45] Apr. 24, 1979

[54] SOUND RECORDING AND REPRODUCING APPARATUS, AND RECORD CONTAINING CASE AND RECORDING MEDIUM

[76] Inventors: Hiroshi Yamamoto, 4-14-11, Shimotakaido, Suginami-ku Tokyo; Isuke Sato, 1081, Tsurumaki Hatano City Kanagawa Pref., both of Japan

[21] Appl. No.: 854,071

[22] Filed: Nov. 22, 1977

[51] Int. Cl.² .................. G11B 17/22; G11B 23/02
[52] U.S. Cl. .................................. 360/98; 360/132; 209/554; 274/10 D
[58] Field of Search ............... 274/14, 1 R, 10 D; 360/97–98, 132–133

[56] References Cited

U.S. PATENT DOCUMENTS

| | | | |
|---|---|---|---|
| 1,360,617 | 11/1920 | Brand | 209/110.5 |
| 2,977,125 | 3/1961 | Mallina | 274/14 |
| 3,487,390 | 12/1969 | Klinger et al. | 360/98 |
| 3,786,454 | 1/1974 | Lissner et al. | 360/98 |
| 3,975,169 | 8/1976 | King | 360/98 |
| 3,976,301 | 8/1976 | Corbett et al. | 274/10 D |
| 3,994,017 | 11/1976 | Barkhuff et al. | 360/99 X |
| 4,086,640 | 4/1978 | Ragle et al. | 360/99 |
| 4,086,641 | 4/1978 | Ragle et al. | 360/99 |

FOREIGN PATENT DOCUMENTS 2657368 6/1977 Fed. Rep. of Germany ............. 360/98

OTHER PUBLICATIONS

IBM Technical Disclosure Bulletin, vol. 20, No. 7, Dec. 1977, pp. 2799–2800, "Regular Angular Orientation of Flexible Discs" by Bathun.

*Primary Examiner*—John H. Wolff
*Attorney, Agent, or Firm*—Wenderoth, Lind & Ponack

[57] ABSTRACT

A sound recording and reproducing apparatus for receiving a two-part cassette-type case containing a stack of records or sheets carrying mechanically or magnetically recorded information. The apparatus includes a record selecting mechanism which is operated for selecting any one of the stacked records in the case for recording or reproduction by separating the stack of records into upper and lower parts and placing the uppermost record of the lower-part of the stack in a position for recording or reproduction while moving the upper-part of the stack up away from the lower-part of the stack. The records or sheets for use with the apparatus have a particular selecting aperture arrangement, and the record selecting mechanism of the apparatus includes selecting rods which are operated to select records according to the particular selecting requirements of the records. The cassette-type case consists of two releasably locked parts, and permits a selection of records by operating the selecting rods.

22 Claims, 17 Drawing Figures

SOUND RECORDING AND REPRODUCING APPARATUS, AND RECORD CONTAINING CASE AND RECORDING MEDIUM

BACKGROUND OF THE INVENTION

1. Field of the Invention

The present invention relates to a phonograph, and more particularly to a sound recording and reproducing apparatus which includes a record selecting mechanism operated to select any one of a stack of records in a two-part cassette-type case which is placed in position on the apparatus. The invention relates further to a record having a construction for being received by the case and selected by the apparatus.

2. Description of the Prior Art

It is known in the art that records (as well as magnetic sheets) have a central hole for receiving a centering shaft of the record player and have a spiral record groove of a given width outside of the central hole. For reproduction of the recorded material records are individually handled and placed in position on the player. It is also known that there is a reproducing apparatus, such as a juke box, equipped with record selector buttons which are selectively operated or depressed for selecting any one of the records arranged within the apparatus and moving the selected record to the position for reproduction and after the end of the reproduction moving it back to its original position. As readily understood, in this case, the record selecting and moving mechanisms have a very complicated construction which makes the size of the apparatus large as well as making the apparatus expensive, and such apparatus is only novel in that the manual record selection has been mechanized.

SUMMARY OF THE INVENTION

Having the above-mentioned problems of the prior art in view, it is one object of the present invention to provide a sound recording and reproducing apparatus which permits a selection of records or magnetic recording sheets for recording or reproduction from a stack of records or sheets contained in a two-part cassette-type case which is placed in position on the apparatus.

It is another object of the present invention to provide a specially devised two-part cassette-type case forming part of the apparatus for use therewith, and constructed to contain a stack of records or sheets.

It is still another object of the present invention to provide a recording medium forming part of the apparatus for use therewith, and constructed to have a record selecting arrangement having a combination of selecting apertures which are engaged by the selector rods of the apparatus.

It is a further object of the present invention to provide a simple construction and easy-to-operate apparatus.

Features and advantages of the present invention derived from the objects enumerated above are summarized below. The two-part cassette-type case contains a stack of records or sheets, and consists of two upper and lower parts which are normally locked together but which are automatically unlocked when the case is placed in position on the apparatus. The apparatus includes an operating rod which is operated for movement up and down, thus raising the upper part of the case together with the records above a record selected for recording or reproduction, leaving the selected record and records below it in the lower part, and introducing the transducer onto the selected record.

BRIEF DESCRIPTION OF THE DRAWINGS

Other objects, features and advantages of the present invention will become apparent from the following description of the specification and the appended claims with reference to the accompanying drawings, in which:

DESCRIPTION OF THE PREFERRED EMBODIMENTS

Figure 8:
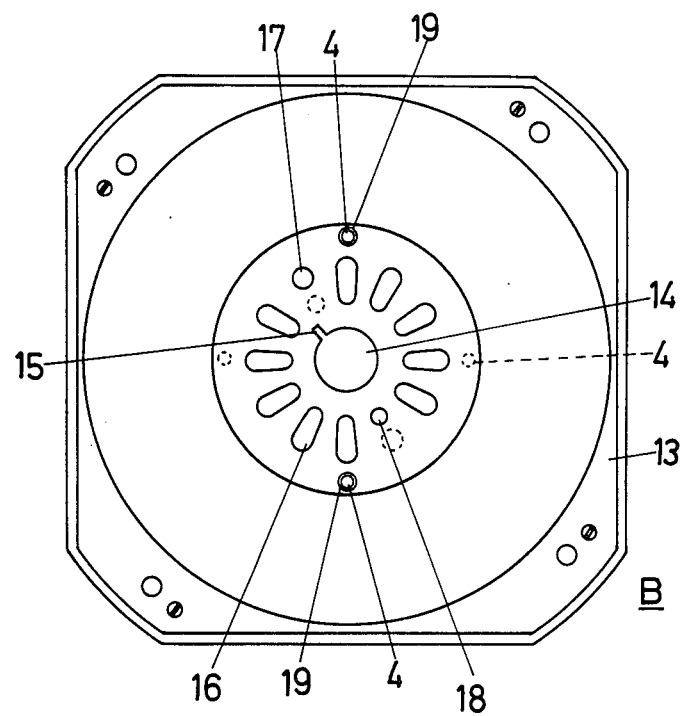
FIG. 8 is a plan view of a two-piece cassette type record case according to the invention for use with the apparatus.
Figure 9:
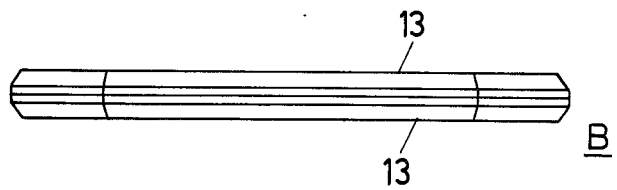
FIG. 9 is a front view of the case of FIG. 8.
Figure 10:
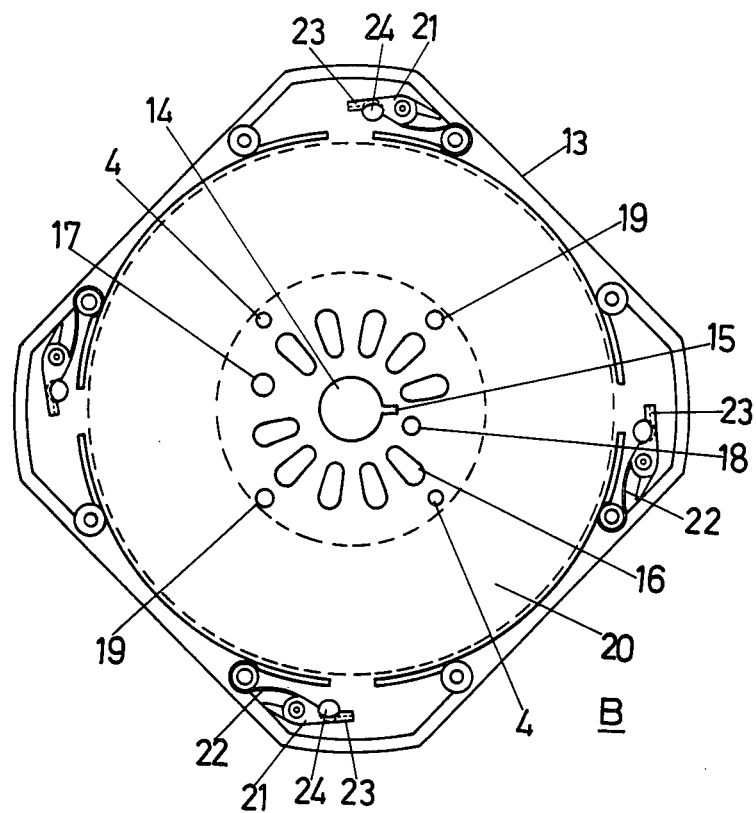
FIG. 10 is a plan view of the lower part of the case of FIG. 9 with the upper part removed.
Figure 11:
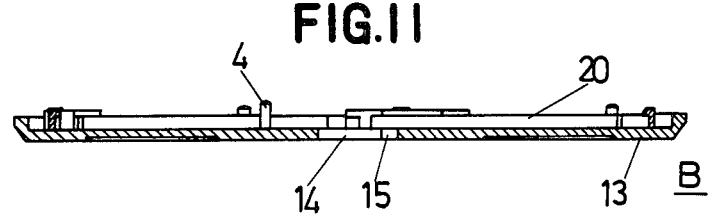
FIG. 11 is a cross-sectional view taken along the horizontal center line of FIG. 10.
Figure 12:
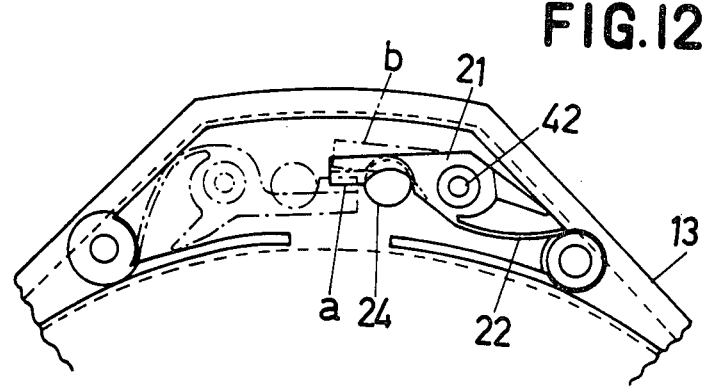
FIG. 12 is a partial plan view, on an enlarged scale, showing the upper and lower parts of the case locked together.
Figure 15:
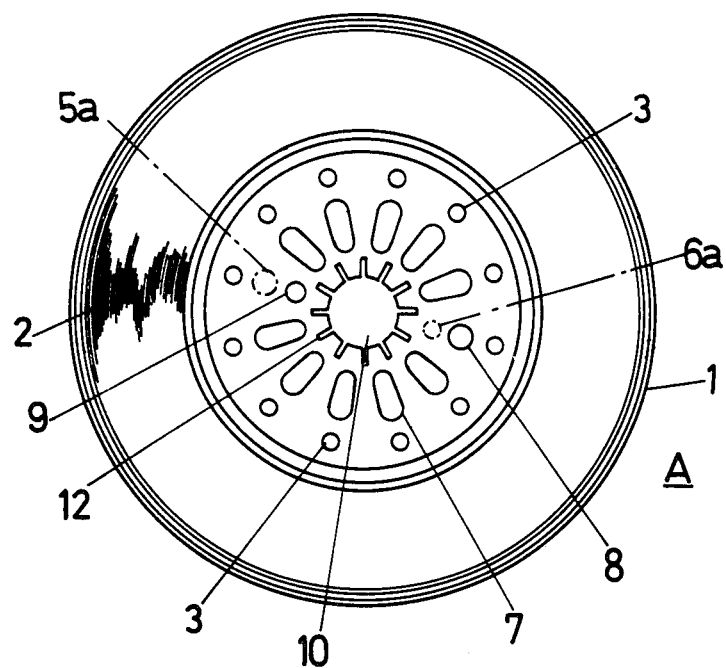
FIG. 15 is a plan view of a record according to the present invention, for use with the apparatus.
Figure 16:
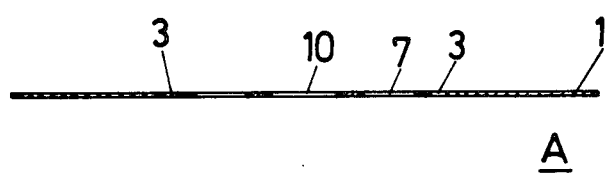
FIG. 16 is a cross-sectional view of the record of FIG. 15.

Referring first to FIG. 15, the construction of one form of a phonograph record, generally designated by A, is illustrated. The record shown has the form of a mechanically recorded disc carrying the usual spiral record groove, but may be a magnetic recording sheet which is reproduced and recorded on by a known record/reproduce head assembly. Although the invention will be described hereinafter with reference particularly to a mechanical record which is reproduced by a reproducing stylus or needle, it should be understood that this is simply for convenience of illustration and the invention allows for the possibility of using magnetic recording sheets, in which case the reproducing stylus should be replaced by the record/reproduce head assembly. Such records and recording sheets are collectively referred to as sheet-like recording media. The record A comprises a body 1 having an outside spiral record groove 2 of a given width and and an inside record selecting area which will further be described below. The record selecting area has a plurality of outside apertures 3, for example twelve apertures, shown spaced at regular intervals surrounding the selecting area for receiving projections 4 on a later described record containing case, a combination of ten elongated apertures 7 and two apertures 8, 9 on a diameter on opposite sides of the center of the record, at different radical distances from the center, and having different sizes, all arranged within the outside apertures 3, and a central guide shaft receiving hole 10. Each of the elongated apertures 7 has an outer enlarged portion for engaging a large-diameter selecting rod 5 shown in FIG. 2 and an inner reduced portion for engaging a small diameter selecting rod 6 shown in FIG. 2. The central hole 10 has twelve slits extending radially from the rim of the hole 10 for engaging a longitudinal projection 11 which runs along the length of a guide shaft 32 shown in FIG. 4. A cassette-type record case of synthetic resin material, generally designated by B is shown in FIG. 8, which consists of two identical rectangular shaped case members 13 which are releasably locked together as shown in FIG. 9. Each of the case members 13 has a central hole 14 for engaging the guide shaft 32, and the hole 14 has one elongated slit extending outwardly from the rim of the hole 14. Each of the case members 13 has the form of a saucer consisting of a central area and an area outside of the central area, the two areas having the forms corresponding to those of a recording medium A. More particularly, the central area has two diametrically opposite apertures 19 and two diametrically opposite projections 4, the aperture 19 being positioned at right angles relative to the projections 4. The central area further has a combination of elongated apertures 16 and two diametrically opposite holes 17 and 18 inside of the apertures 19 and projections 4, the arrangement, forms and sizes of those apertures 16 and holes 17 and 18 corresponding to those of the record A. As particularly shown in FIGS. 10 and 11, the area at 20 is recessed to receive a number of records therein. At each of the four corners of each case member 13 of the case B is rotatably provided a locking arrangement which permits locking the two members 13 together, said locking arrangement consisting of a locking member 21 turning on a pin 42, a resilient member 22 connected to one end of the locking member 21, and a locking end 23 at the other end of the locking member 21. The locking ends 23 of the locking members 21 of the upper and lower case members 13 engage each other so that the case as a whole is normally in its locked condition. As shown, each of the case members 13 has a hole 24 adjacent to the locking member 21 and partly covered by the member 21, said hole 24 receiving a projection 25 provided on the apparatus for moving the member 21 on the pin 42 to cause the locking end 23 of one case member to disengage from the end 23 of the other case member.

Figure 1:
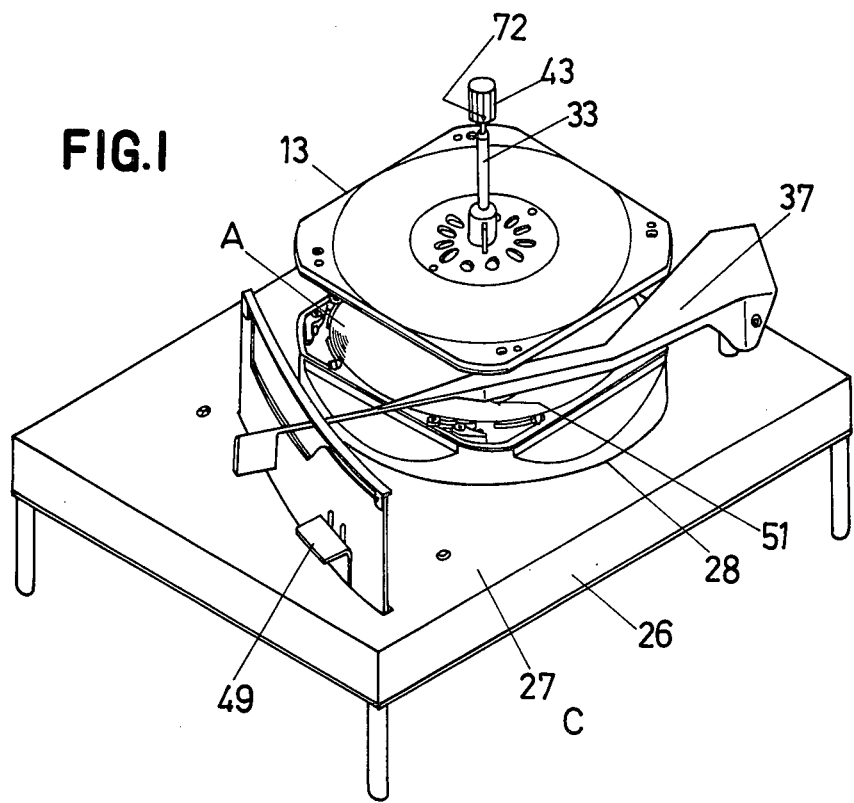
FIG. 1 is a perspective view of an apparatus according to the present invention showing the reproducing stylus placed on a selected record for reproduction.
Figure 2:
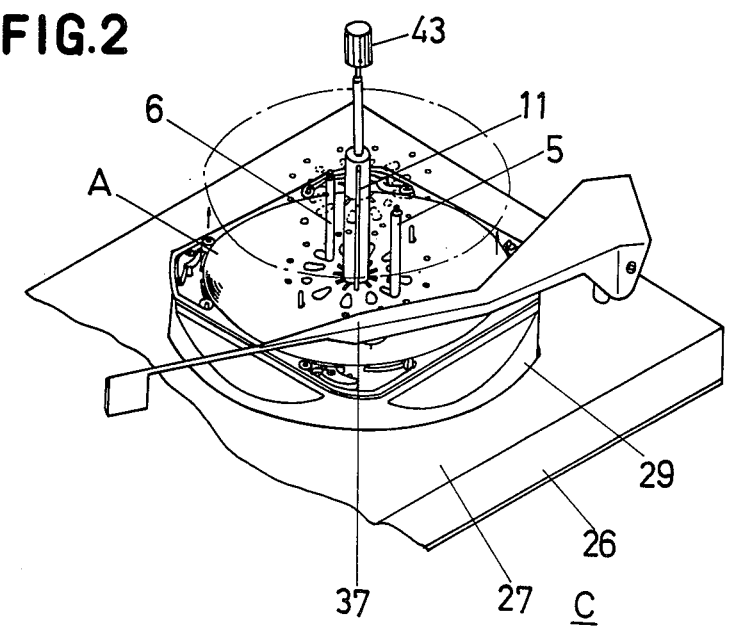
FIG. 2 is a perspective view of the apparatus of FIG. 1, showing the internal record selecting mechanism with the upper case part and the upper part of the stack of records omitted for convenience of illustration.
Figure 17:
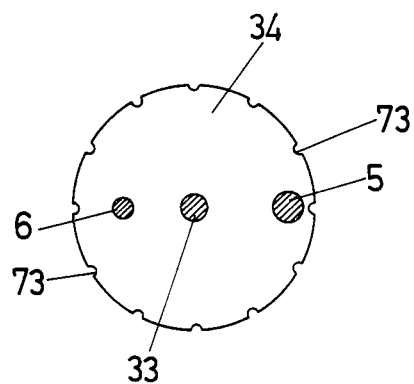
FIG. 17 is a plan view of a horizontal plate in operative association with the operating rod of the apparatus.

In FIGS. 1 and 2, the recording and reproducing apparatus, generally designated by C, comprises a chassis 26, a top plate 27 rigidly mounted on the chassis 26 and having a central opening 28, and a turntable 29 rotatably mounted inside the opening 28. As particularly shown in FIG. 4, the turntable 29 has two diametrically opposite projections 25 extending from the upper surface thereof just inside the circumferential edge of the turntable, for releasing the locking arrangement of the record case B from its locked condition, and has a central recessed portion 30. The central recessed portion has a cover 31 which covers the upper opening of the recessed portion 30, and a hollow guide shaft 32 is rigidly secured to the cover 31 at the central portion thereof. An operating rod 33 extends through the guide shaft 32, and through the interior of the recessed portion 30 and has the lower end rigidly secured to a horizontal plate 34 such that the plate 34 can be held in a horizontal position. To the plate 34 are rigidly fixed the two selecting rods 5 and 6 having different diameters which extend vertically therefrom in the spaced relationship described above. The two vertical rods 5 and 6 are on diametrically opposite sides of the rod 33 and arranged so that they can align themselves with the corresponding apertures 7 and 16 on a record A and case B, and can engage the apertures 7 and 16. The selecting rods 5 and 6 shown having different diameters, but they may have an identical or like diameter, and their locations may be otherwise than diametrically opposite. It should be understood, however, that their locations must correspond to the locations of the apertures 7 and 16 in the record A and the case B. Fixing members 35 are secured to the underside of the cover 31, and extend downwardly therefrom. A spring 36 is mounted on and secured to each of the fixing members 35, for holding the plate 34 in a horizontal position. As shown in FIG. 17, the plate 34 has a plurality of notches 73 spaced at regular intervals around the circumferential edge thereof, the number of the notches 73 having a predetermined correspondence to the number of the records to be selected (twelve notches for ten records, for example). Each notch 34 is normally engaged by the lower end 36a of a corresponding spring 36 so that the plate 34 can rotate through selected angles and at regular pitches. The aforementioned top plate 27 carries a pickup arm 37 having one end thereof pivotally mounted on one side of the plate 27 for swivelling movement. The top plate 27 also has a vertical guide plate 38 on the other side thereof for supporting and guiding the free end of the pickup arm 37, the guide plate 38 being capable of movement up and down within a stationary guide frame 39 rigidly mounted on the top plate 27.

Figure 3:
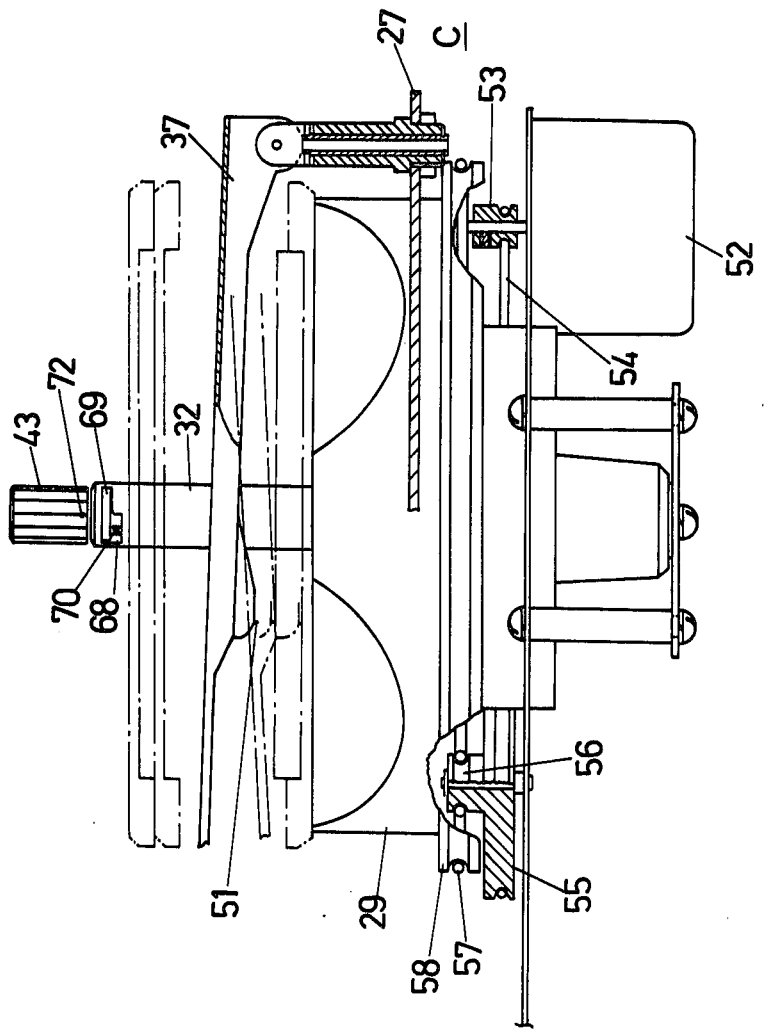
FIG. 3 is an enlarged front view, partly broken away, of the apparatus of FIG. 1.
Figure 4:
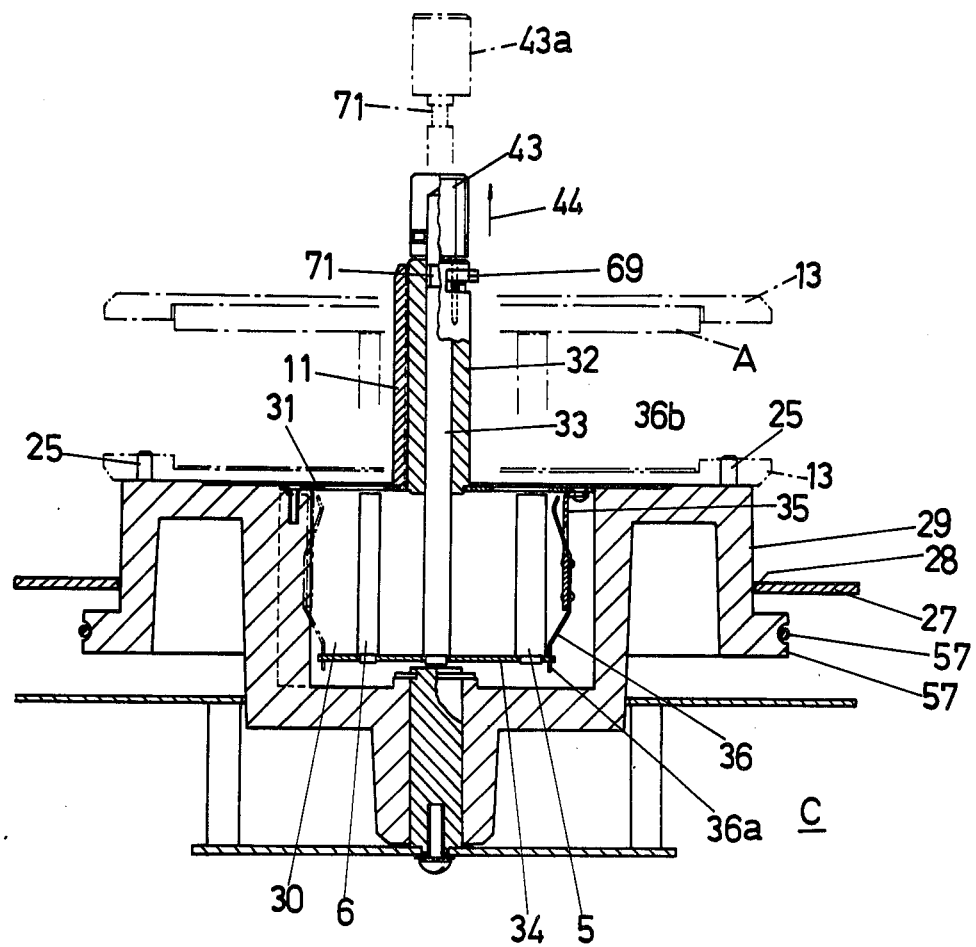
FIG. 4 is a partial cross-sectional view, or an enlarged scale, of the apparatus of FIG. 1, showing records in a raised position.
Figure 5:
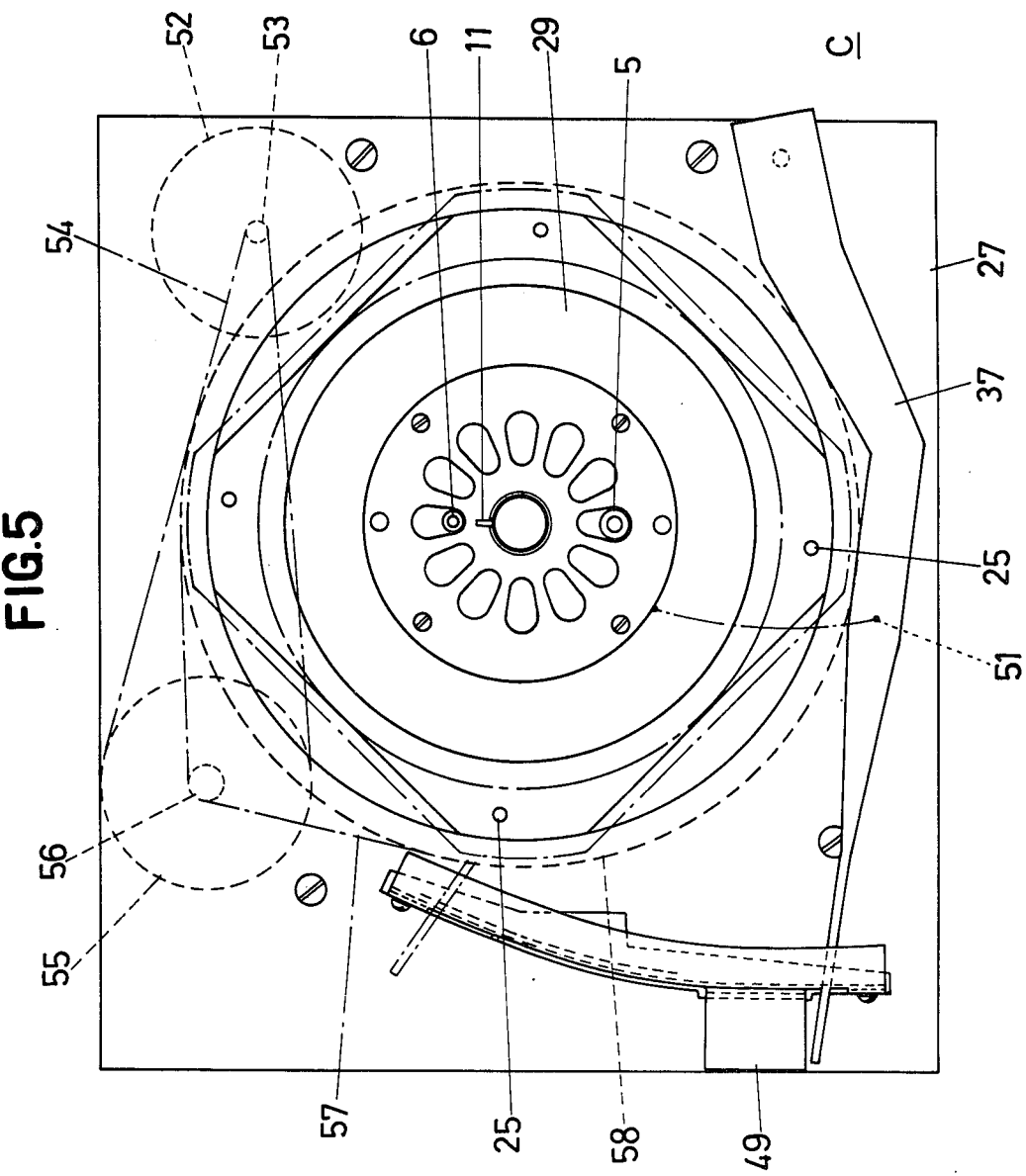
FIG. 5 is an enlarged plan view of the apparatus of FIG. 1.
Figure 6:
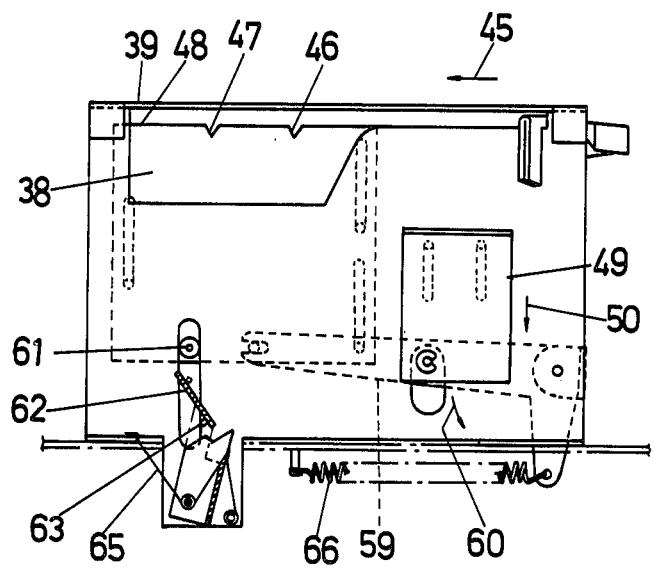
FIG. 6 is an enlarged side view of a pickup arm guide assembly showing a guide plate in its raised position.
Figure 7:
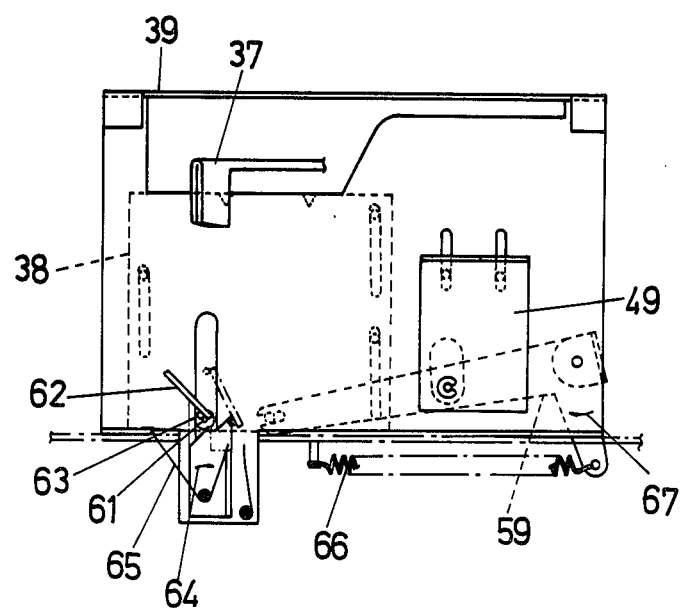
FIG. 7 is an enlarged side view of the guide assembly showing the guide plate in its lower position.
Figure 13:
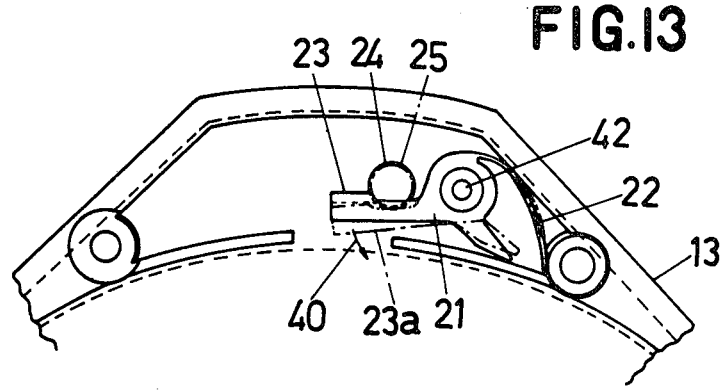
FIG. 13 is a partial plan view, on an enlarged scale, illustrating the operation of the locking mechanism of the case.
Figure 14:
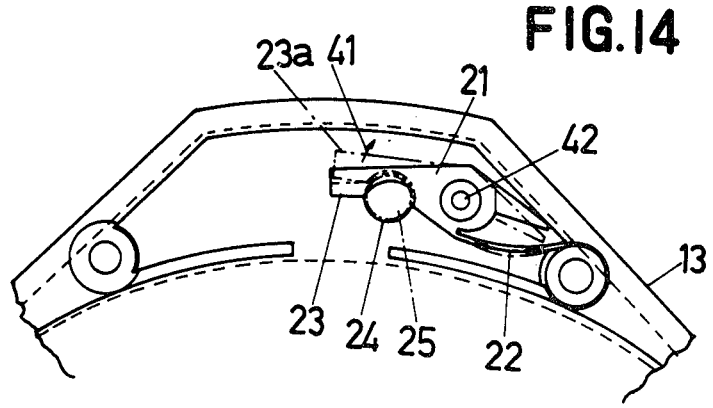
FIG. 14 is also a plan view, on an enlarged scale, illustrating the operation of the locking mechanism.

The operation of the apparatus according to the embodiment described hereinbefore will now be described, in connection with the playing of a record having a spiral record groove. The cassette-type record case B containing a number of records is set in position on the the turntable 29 in such a manner that the projections 25 on the plate 29 engage the appropriate insertion holes 24 of the case B. Setting the case B in the above manner causes the locking members 21 of the upper and lower case parts 13 to rotate on the pins 24 as indicated by arrow 40 or 41 in FIG. 13 or 14 and thus move the locking ends 23 from the position shown by a in dot-dash lines to the position b in which the locking ends 23 of the two parts 13 are disengaged from each other. Reversely, when the case B is removed from the apparatus, the lock release projections 25 move out of the apertures 24 to permit the parts of the locking device to engage each other at their ends 23 under the action of the resilient member 22, thereby locking the two parts 13 together. After the record case B is positioned, lifiting the knob 43 on the upper end of the operating rod 33 as shown by arrow 44 in FIG. 4 to the position 43a indicated by dot-dash lines causes the plate 34 fixed to the lower end of the rod 33 and the selecting rods 5 and 6 to be moved up therewith. The rods 5 and 6 pass through the selecting holes in the lower case member 13 of the case B, and if the rods 5 and 6 are positioned as indicated at 5a and 6a by dot-dash lines in FIG. 15 relative to a given record of the stacked records A, contacting the unapertured area of the record, and if the operating rod 33 is further lifted, the rods 5 and 6 abutting said given record move said given record, the records above it and the upper case member 13 upwardly together, separating the two case members 13 as indicated by dot-dash lines in FIG. 1 or 4, the upper member containing the given record and the records above it, and the lower member containing an uppermost record to be played. In this case, the plate 34 is held in its raised position by the notches 73 in plate 34 being engaged by the upper ends 36b of the corresponding springs 36. Then, the free end of the pickup arm 37 is moved in the direction of the arrow 45 in FIG. 6 along the guide plate 38 to the position of one of the V-shaped notches positions 46 and 47 (the notch may have any other shape or form) or to the fartherst position 48. When the pickup arm 37 is stopped in any selected position, the operating rod 49 is then depressed in the direction of the arrow 50 in FIG. 6, causing the guide plate 38 to be moved down therewith as shown in FIG. 7 while causing the stylus 51 on the pickup arm 37 to be placed in the starting point of the selected record. The playback operation is now ready to begin, and the motor switch (not shown) is activated, turning on the motor 52 which imparts its rotary motion to the turntable 29 by way of a pulley 53, belt 54, pulleys 55 and 56, a belt 57 and a pulley 58 in that order as shown in FIG. 3. The playback takes place in the ordinary manner. In the above description, the pickup arm 37 can be set in any of the three positions 46, 47 and 48 in FIG. 6, and the record A can have three record sections on each face which correspond to the above positions and each of the positions corresponds to the starting point of a respective record section. If a record has a size which permits the record to carry fifteen minutes of information on one face, each of the three sections can have carry information which corresponds to a period of five minutes. The reproduction can be started at any section and at any position of each section. If a record of a greater size is employed, the record can have more than three sections, e.g., four to six sections or more, and the number of the pickup arm setting positions can be increased to correspond to the increased number of sections. Thus, the record can provide a wider range of selection of different pieces of information. As the operating plate 49 is depressed the lever 59 is pivoted in the direction of the arrow 6Q as the guide plate 38 is moved down therewith, as already described, and a projection 61 on the guide plate 38 engages a projection 63 on the plate 62 rotatably mounted on the guide frame 39, thus holding the guide plate 38 in its lower position. When the operating plate 49 is then moved down a slight distance, the guide plate 38 moves down slightly, disengaging the projection 63 from the projection 61 and thus causing the locking plate 62 to be moved in the direction of the arrow 64 under the action of a spring 65 while causing the lever 59 to be pivotally moved in the direction of the arrow 67 under the action of a spring 66 thus moving the guide plate 38 upward. In other words, the guide plate 48 which is held in its lower position after the initial depression of the operating plate 49 is released from its locked condition by the further depression of the plate 49. In FIG. 3, the guide shaft 32 is shown as having a slit 68 in the upper portion, and a stop member 69 is rotatably provided within the slit 68 and is biased by a spring 70. The spring loaded stop member 69 is housed in a groove 71 in the upper portion of the operating rod 33 as shown in FIG. 4. Thus, when the knob 43 of the operating rod 33 is lifted, the grooved portion 71 of the rod 33 is displaced therewith, allowing the stop member 69 to project outside the guide shaft 32 against the action of the spring 70 and thus to prevent escape of the upper part 13 of the case B. When the operating rod 32 is at its lowest position, when an appropriate one of the selecting markers on the outer surface of the knob 43, e.g. the marker 72, is set at a position corresponding to the side projection 11 on the guide shaft 32, the selecting rods 5 and 6 are aligned with the apertures in a record which corresponds to the selected marker and pass therethrough, allowing the record to be selected by lifting the operating rod 33 which separates the stacked records in the case B leaving the selected record as the uppermost record in the lower case member 13.

If the reverse sides of the records in the case B are to be reproduced, the case B has only to be turned upside down and placed in position on the apparatus. The above described procedures are then followed. In the described embodiment where ten selecting holes are provided, ten records can be placed in the case B in a predetermined order of rotational positions around the center thereof. As the positions of the selecting rods can be changed only when the operating rod is in its lowermost position, there is no risk of disturbing the relative positions of the records during the lifting of the operating rod. As described, one of the selecting rods has a greater diameter than the other, and this ensures the records are supported with greater stability.

When the case B is lifted away from the turntable, the projections 25 on the turntable are withdrawn from the holes 24, allowing the locking members 21 automatically to be locked together by the resilient members 22 and thus holding the case B in its locked condition. The case B can be handled without disturbing the relative positions of the records therein and without the case members 13 becoming detached from each other. The records are placed in the case B at regular angular intervals of for example 30 DEG. and held in position by the case members 13 so that the records are properly arranged relative to each other as long as the case members 13 are in their closed position. When separating the case members 13 for recording or reproduction, the records are maintained in their relative positions by causing the longitudinal projection on the guide shaft to engage the slit 15 extending from the central hole of each record. A stack of ten records each 0.2 mm thick for example has to a thickness of 2 mm, and the record case B can contain 5 mm or less total thickness of records. If each record can contain 30 minutes of information on both sides, ten records can contain a total of 300 minutes (five hours) of information. Records can be cassetted according to units of study such as would together form a text book. Cassette-type cases containing a number of records can be arranged in order in a relatively small space.

One of the features of the invention lies in the easy access to information desired. If a record can has three record sections on each face to be accessed, the record can have six sections on both faces. As a result, ten records have sixty accessible sections in total. Difficulties are encountered in accessing desired information on the conventional mechanical records and magnetic sheets. It is known that in the case of magnetic sheets a counter is used to reference the locations of information, but the accuracy of the location of information is not satisfactory. There are as many different modes of access as there are different types of recorders, and a counter must be reset to zero whenever a new reel or cassette is loaded for recording or reproduction. This causes a problem in operation.

The above problem has been eliminated by the present invention, which permits automatic selective accessing of information on each record or sheet and on each side of the record. Although the invention has been illustrated with particular regard to a grooved mechanically reproduced record, it is apparent that the invention can be applied to magnetic recording sheets in which case the magnetic read/write device is provided in place of the reproducing stylus and makes possible both recording and reproduction. The invention is applicable to use with magnetic sheets without modifying the construction described herein in any substantial manner and by simply replacing the stylus cartridge by the read/write head assembly. In addition, it should be understood that the invention may have various changes and modifications without departing from the spirit and scope thereof.

What we claim is:

1. In combination:
   a recording media containing case having separable mating upper and lower parts;
   a stack of a plurality of sheet-like recording media in said casing stacked one on top of the other and each having an outer area on which information can be recorded and having a central area for containing aligning and selecting apertures, said central area having:
   (a) a central aperture with a plurality of elongated slits extending radially outwardly from the edge of the aperture;
   (b) a plurality of elongated radial openings regularly spaced circumferentially around said central aperture and outside of said central aperture, said central area having a gap between at least two of said radial apertures; and
   (c) a plurality of locating apertures spaced at regular circumferential intervals outside of said elongated radial apertures; said recording media being at different rotational positions around the central aperture with the locating apertures aligned and the gap of each recording medium at a different rotational position than the gaps of the other recording media;
   each of the parts of said case having a central guide aperture aligned with the central apertures of the stack of recording media and a slit extending outwardly from said central guide aperture aligned with the slits in the recording media, a plurality of elongaged radial openings spaced circumferentially around said central guide aperture and aligned with the corresponding radial openings in the recording media, record locating projections extending through the locating apertures in the recording media, and recording locating apertures for receiving the ends of locating projections on the other case part for holding the recording media firmly in position in the case, and locking means engaging a corresponding locking means on the other case part for locking the case parts together, and apertures in the case part adjacent said locking means; and
   a recording and reproducing apparatus having a chassis, a turntable on said chassis on which said case is removably mounted, said turntable having a central recess therein, a central hollow vertical guide shaft on said turntable above said recess and extending through the central guide apertures in the parts of the casing and through the central guide apertures in the parts of the casing and through the central apertures in the stack of recording media and having a rib thereon engaged in said slits, a vertical operating rod extending through said guide shaft and having a horizontal plate member on the bottom end thereof in said recess, rod means on said plate member and extending upwardly and movable through the elongated radial openings in the case and the recording media to engage the gap of a recording media above a selected medium when the operating rod is raised for lifting the engaged recording medium and lifting the portion of the stack of recording media above the selected medium and the upper part of the case for exposing the selected recording medium, unlocking means on said turntable extending through the apertures in the case adjacent the locking means for unlocking the locking means, and a transducing means on said chassis and movable into engagement with an exposed recording medium in the case for recording and/or reproducing from the recording medium.

2. The combination as claimed in claim 1 in which said operating rod is rotatable and said apparatus has retaining means in said recess for retaining said rod at regular angular intervals corresponding to the spacing of the radial openings in the case and the recording media.

3. The combination as claimed in claim 2 in which each recording medium has two gaps on diametrically opposite sides of the central aperture therein, one gap having a first hole of a first diameter therein at a first distance from the central aperture and the other gap having a second hole of a second diameter at a second distance from the central aperture, said first and second diameters and said first and second distance being different, and said rod means being a pair of rods, one rod being a first diameter and being spaced from said operating rod a distance for aligning it with said first hole in a corresponding recording medium and the other rod being of a second diameter and being spaced from said operating rod a distance for aligning it with said second hole in a corresponding recording medium, and said radial openings having a size at the inner end for accomodating the rod closer to the operating rod and a size at the other end for accomodating the rod farther from the operating rod.

4. The combination as claimed in claim 2 in which said retaining means includes rod locking means for holding said operating rod at its uppermost and lowermost positions.

5. The combination as claimed in claim 2 in which said plate member has a plurality of notches spaced at regular angular intervals around the periphery thereof, and said retaining means comprises spring means in said recess for engaging said notches in said plate member.

6. The combination as claimed in claim 5 in which the number of said notches is equal to the number of elongated radial openings in said case.

7. A recording medium containing case for enclosing a stack of a plurality of sheet-like recording media, said case being for use with a recording and reproducing apparatus having a vertically movable central guide rod and a rib along the axial length thereof and a record selecting rod means operatively associated with the central guide rod and projecting from the apparatus and manipulatable by said central guide rod for selecting a recording medium, said case comprising separable mating upper and lower case parts each having:
(a) an internal recess for receiving a plurality of recording media in a stacked condition with the recording media against each other,
(b) a central guide aperture through which the central guide rod of the recording and reproducing apparatus extends when the case is mounted on the apparatus and a slit extending outwardly from the rim of the guide aperture for engaging a rib on the guide rod,
(c) a plurality of circumferentially regularly spaced radially elongated apertures through which the record selecting rods of the apparatus extend when the guide rod is manipulated,
(d) record locating projections insertable through locating apertures in the stacked recording media, and record locating apertures for receiving said locating projections on the other case part for holding the recording media firmly in position and for allowing each recording medium to be selected by the selecting rod means of the apparatus, and
(e) locking means for engagement with corresponding locking means on the other case part for locking the case parts together.

8. A recording medium containing case as claimed in claim 7 in which said locking means comprises a locking member, a spring connected to said locking member normally urging said locking member toward a locking position for locking the locking member of one case part to the locking member of the other case part.

9. A recording medium containing case as claimed in claim 7 in which each case part has a lock releasing aperture therein partly covered by a part of said locking means, whereby when the case is mounted on the apparatus a lock releasing projection on the apparatus can extend through the lock releasing aperture and engage the locked locking members to unlock them.

10. A recording medium containing case as claimed in claim 7 in which the parts of the case having the same shape, whereby the case can be mounted on the apparatus with either of the case parts against the apparatus.

11. A sheet-like recording medium for use with a record case enclosing a stack of such recording media and mountable on a recording and reproducing apparatus having a vertically movable central guide rod for selecting individual recording media and a pair of second selecting rods operatively associated with said central guide rod and projecting from the apparatus and manipulatable by said central guide rod for selecting recording media, said medium having an outer area on which information can be recorded and having a central area for containing aligning and selecting apertures, said central area having:
(a) a central aperture with a plurality of elongated slits extending radially outwardly from the edge of the aperture for engagement with a rib on a guide shaft for supporting the recording medium in a stationary position;
(b) a plurality of elongated radial openings regularly circumferentially around said central aperture and outside of said central aperture, said central area having a gap between at least two of said radial apertures for being engaged by the record selecting rods for selecting a recording medium, said elongated openings passing the selecting rods to the recording medium just above the selected medium; and
(c) a plurality of locating apertures spaced at regular circumferential intervals outside of said elongated radial apertures for receiving locating projections in the record case for locating the recording medium in position.

12. A sheet-like recording medium as claimed in claim 11 wherein each of said elongated radial openings has an outer larger portion and an inner smaller portion.

13. A sheet-like recording medium as claimed in claim 11 wherein there is one of said elongated slits for each of said locating apertures.

14. A sheet-like recording medium as claimed in claim 11 wherein said medium is a grooved disc.

15. A sheet-like recording medium as claimed in claim 11 wherein said medium is a magnetic sheet.

16. A sheet-like recording medium as claimed in claim 11 wherein said central area has two gaps on diametrically opposite sides of said central aperture, the first gap having a first hole of one diameter positioned at a first radial distance from said central aperture, and the other gap has a second hole of a different diameter than said first hole and spaced a second radial distance from said central aperture which is different from said first radial distance.

17. A recording and reproducing apparatus for receiving thereon a separable multi-part locking means-containing case having a stack of recording media therein and selectively recording on and/or reproducing from the individual recording media which are exposed when the case is separated, said apparatus comprising:
a chassis having a turntable thereon for receiving the case thereon and having a central recess therein;
a central vertical hollow guide shaft mounted on said turntable above said recess for supporting the case and the recording media therein by extending through a central aperture of the case and the recording media;
recording medium selecting means in said recess and extending vertically through said hollow guide shaft and manipulatable for moving into the case and separating the parts of the case and the stack of recording media therein and exposing a selected medium on the recording media;
unlocking means on the turntable engagable with the case for releasing the locking means in the case when the case is placed in position on the turntable; and
a transducing means on said chassis and movable into engagement with an exposed recording medium in the case for recording on and/or reproducing from the recording medium.

18. An apparatus as claimed in claim 17 in which said recording medium selecting means comprises a vertical operating rod extending through said guide shaft and movable up and down within said shaft, a horizontal plate member secured to the lower end of said operating rod, and two different diameter vertical selecting rods secured to said plate member at points spaced from said operating rod and movable into the case through the apertures in the case and through apertures in the recording media to engage a recording media next above the selected medium in the stack of recording media for lifting the upper part of the case and the portion of the stack above the selected recording medium.

19. An apparatus as claimed in claim 18 in which said operating rod is rotatable and said selecting means further comprises means for retaining said rod an angular intervals for selectively determining the positions of said selecting rods.

20. An apparatus as claimed in claim 19 in which one of said vertical selecting rods is a small-diameter rod mounted nearer to said operating rod and the other of said vertical selecting rods is a large-diameter rod mounted farther from the operating rod.

21. An apparatus as claimed in claim 20 in which said plate member has a plurality of notches spaced at regular intervals around the periphery thereof, and said retaining means is resilient members in said recess for engaging said notches when said plate member is in the lowermost and the uppermost positions in said recess.

22. An apparatus as claimed in claim 21 in which said guide shaft has a longitudinal projection along the length thereof for engaging corresponding slits extending from the central apertures in the case and recording media.

* * * * *